United States Patent [19]

Speranza et al.

[11] Patent Number: 5,013,812

[45] Date of Patent: May 7, 1991

[54] POLYBIURETS

[75] Inventors: George P. Speranza; Wei-Yang Su, both of Austin, Tex.

[73] Assignee: Texaco Chemical Company, White Plains, N.Y.

[21] Appl. No.: 448,416

[22] Filed: Dec. 11, 1989

[51] Int. Cl.$^5$ .............................................. C08G 18/10
[52] U.S. Cl. ........................................ 528/60; 528/61; 528/68; 528/76
[58] Field of Search .................... 528/60, 61, 76, 68

[56]         References Cited
         U.S. PATENT DOCUMENTS 4,795,764  1/1989  Alm et al. ............................. 528/76

Primary Examiner—Maurice J. Welsh
Attorney, Agent, or Firm—Jack H. Park; Kenneth R. Priem; Cynthia L. Kendrick

[57]         ABSTRACT

Disclosed are polybiuret compositions prepared by the reaction of a polyoxyalkylene polyurea and a polyisocyanate.

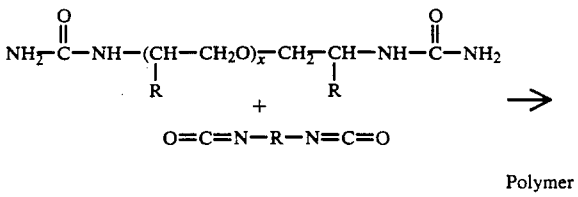

Polymer where R is H, CH$_3$ or C$_2$H$_5$ and R' is an organic radical. The reaction product of a polyoxyalkylene polyurea and polyisocyanates are prepared without the necessity of a catalyst.

19 Claims, No Drawings

POLYBIURETS

FIELD OF THE INVENTION

The present invention relates to the preparation of polybiurets. The invention describes the preparation of polybiurets by the reaction of isocyanates with polyoxyalkylene polyurea derivatives. More particularly, this invention relates to polyoxyalkylene polyurea derivatives produced by the reaction of polyoxyalkylene amines with urea and subsequently reacted with a polyisocyanate to form novel biuret foam products. The reaction takes place at low temperatures and requires no catalyst, although organometallic compounds such as organotin compounds can be used.

Though previously known in the art as a side reaction, the instant invention demonstrates a method to use this reaction to make useful products.

BACKGROUND OF THE INVENTION

It is well known to those skilled in the art that biurets are formed as a side reaction in the formation of urethane foams. This can be represented by the equation:

$$RNCO + RNH-\underset{\underset{O}{\|}}{C}-NH-R \longrightarrow R-\underset{\underset{\underset{\underset{R}{|}}{NH}}{\underset{C=O}{|}}}{N}-\underset{\underset{O}{\|}}{C}-NH-R \quad (1)$$

This reaction is reported to be reversible by heating at temperatures of 110° to 130° C. See *Polyurethanes, Chemistry and Technology*, Part I by J. H. Saunders and K. C. Frisch, Interscience Publisher. Normally this reaction is reported to be weakly catalyzed by tin catalysts but not tertiary amines.

Since most flexible foams are made with excess isocyanates, biuret linkages are usually present in these foams. The reaction products, represented by $$R-NH-\underset{\underset{O}{\|}}{C}-NH-R$$

possess acid protons and are significantly slower in reactivity toward isocyanates than hydroxyl groups, but under more vigorous reaction conditions are capable of reacting with additional isocyanates.

Typical reactions of isocyanates with ureas can be represented by the following:

$$R-NH-\underset{\underset{O}{\|}}{C}-NH_2 \xrightarrow{R'NCO} \quad (2)$$

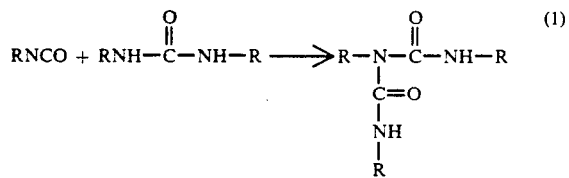

$$C_6H_5NCO + NH_2-\underset{\underset{O}{\|}}{C}-NH-CH_3 \longrightarrow \quad (3)$$

-continued $$C_6H_5-NH-\underset{\underset{O}{\|}}{C}-NH-\underset{\underset{O}{\|}}{C}-NH-CH_3 +$$

$$C_6H_5-NH-\underset{\underset{O}{\|}}{C}-\underset{\underset{CH_3}{|}}{N}-\underset{\underset{O}{\|}}{C}-NH_2$$

There is a general review of the subject in "The Chemistry Of Organic Isocyanates", J. H. Saunders and R. J. Slocombe, *Chem. Reviews*, Vol. 43, 1948.

It is also known that if hexamethylene diisocyanate is allowed to react with water in a molar ratio of 3:1 a triisocyanatobiuret is formed:

$$3\ O=C=N-(CH_2)_6-N=C=O + H_2O \longrightarrow$$

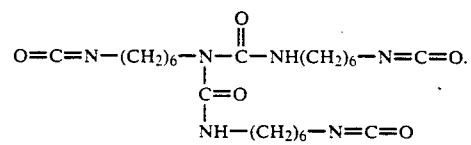

It would be of interest in the art to develop a process to use this side reaction from the production of urethane to make other useful products. It would further enhance the commercial potential of this process if the reaction took place at mild temperatures and ambient pressure without the necessity of a catalyst.

In the instant invention a process has been discovered whereby useful products result from this reaction. The products include flexible, semi-rigid and rigid foams which gel at room temperature. Further, these novel biuret foams were formed without the addition of a catalyst.

SUMMARY OF THE INVENTION

It is an object of the present invention to make useful polybiuret foam products having a wide range of densities which allow the products to be either flexible, rigid or semi-rigid. It is believed these foams could be easier to fire retard than normal polyurethane foams.

More specifically, in accordance with the present invention there is provided a method for the preparation of polybiuret foams which comprises reacting the polyurea derivative of a polyoxyalkylene amine or a urea capped polyoxypropylene amine with an isocyanate or conventional prepolymer of a commercial isocyanate, at room temperature to about 130° C. and atmospheric pressure. Both silicone surfactants and chain extender effects were also examined in the foam preparations.

DESCRIPTION OF THE PREFERRED EMBODIMENT

According to the present invention a polybiuret foam having a density ranging from 1.5 to 7.8 pcf can be obtained by a method wherein polyurea derivatives of polyoxyalkylene amines are reacted with polyisocyanates. The polyurea derivative is derived from the reaction of a polyoxyalkylene amine and a urea. The reaction for the preparation of the biuret from the polyurea and polyisocyanate is described below:

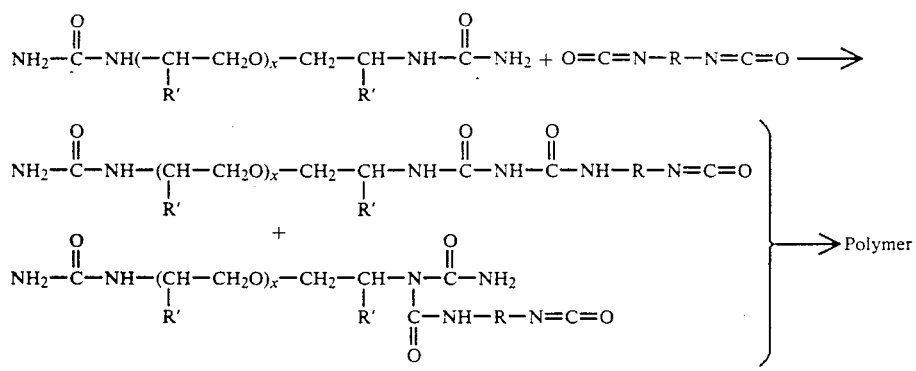

where x is 2 to about 50 and R' is H, $CH_3$ or $C_2H_5$ and R is an organic radical.

In another embodiment a polyoxypropylene diureide is reacted with a prepolymer resulting from the reaction of a polyoxyalkylene amine or a polyol and an isocyanate.

The novel polybiuret foams of the present invention are versatile products which contain as the principal reaction components a polyoxyalkylene amine, a urea and an isocyanate or, alternatively, a polyoxypropylene diureide and a prepolymer of an isocyanate and a polyol.

Generally, the polyoxyalkylene amine can be represented by the formula:

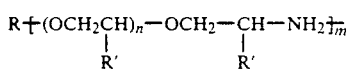

wherein R is the nucleus of an oxyalkylation susceptible polyhydric alcohol containing 2 to 12 carbon atoms and 2 and 3 hydroxyl groups, R' is hydrogen or methyl, n is a number having an average value of 0 to 50 and m is an integer having a value of 2 to 3.

One group of polyoxyalkylene amines which are particularly suitable are polyoxyalkylene triamines of the formula:

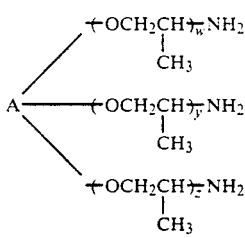

wherein A represents the nucleus of an oxyalkylation-susceptible trihydric alcohol containing about 3 to about 6 carbon atoms, w, y and z are numbers and the average value of the sum of w+y+z is from about 4 to about 100.

Examples of commercial products having the above-identified formula are JEFFAMINE®T-series amines, produced by Texaco Chemical Company. An example of such a product is JEFFAMINE® T-403 amine having an average molecular weight of about 400 wherein A represents a trimethylol propane nucleus, and the product contains about 5 to about 6 moles of propylene oxide. Another product is JEFFAMINE® T-5000 amine, having an average molecular weight of about 5000 wherein A represents a glycerol nucleus and the product contains about 85 moles of propylene oxide. A product which is especially useful is JEFFAMINE® T-3000 amine, containing about 50 moles of propylene oxide and having an average molecular weight of about 3000.

As mentioned the polyoxyalkylene amine is reacted with urea, $CO(NH_2)_2$, to form a polyurea. These polyurea components serve as the hydrogen component to react with polyisocyanates for the preparation of the polybiuret foams. The polyisocyanates which are suitable for use in the invention include those having the formula:

where R is represented by aliphatic, aromatic or cycloaliphatic organic radicals. Any isocyanate having the desired functionality will work. Aromatic diisocyanates which work in the invention include naphthalene diisocyanate, diphenylmethane diisocyanate and toluene diisocyanate. Commercial polyisocyanates which work in the invention include ISONATES® and RUBINATES®. ISONATE® 143L is the tradename for a modified diphenylmethane diisocyanate produced by Dow. RUBINATE® M is a polyarylpolyisocyanate produced by ICI.

Of course, the term "polyisocyanate" also includes quasi-prepolymers with active hydrogen-containing material.

In the alternative embodiment, where a polyoxypropylene diureide is reacted with a prepolymer, the diureide can be represented by the formula:

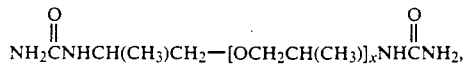

where x is 2 to about 50. A commercial product which fits the above description is JEFFAMINE® BuD-2000 urea, produced by Texaco Chemical Company, a polyoxypropylene diureide having a molecular weight of 2000. JEFFAMINE® BuD-2000 urea is a urea capped JEFFAMINE® D-2000 amine.

The prepolymer is produced by the reaction of a polyoxyalkylene diamine or a polyoxyalkylene polyol with an isocyanate. The polyoxyalkylenes and isocyanates preferably conform to the description of those described above.

The polyols can be described as polypropylene glycols represented by:

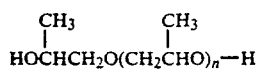

where n is about 6 to about 35, having a molecular weight of about 400 to 2000. Suitable commercial products include JEFFOX® polypropylene glycols manufactured by Texaco Chemical Company, including JEFFOX® PPG-2000, represented by the formula above, where n=35 and having a molecular weight of about 2000.

Another particularly suitable glycol is Triol G-5000, a polypropylene oxide triol with a molecular weight of about 5000.

As stated, the art would indicate the use of a tin catalyst in the reaction of isocyanates. However, no catalyst was necessary in the instant invention. It was found that the reaction of JEFFAMINE® urea derivatives with isocyanates goes slowly in the absence of water. Apparently water can function as both catalyst and blowing agent. The gel time varied from a matter of seconds up to about 30 minutes or more. Conventional prepolymers of isocyanates used in the reaction injection molding art were reacted with a diureide in a similar manner.

The polyureides are prepared by charging a flask with the polyoxyalkylene amine and urea and heating the mixture at a temperature of about 50° C. to 180° C. (135-140) for about 5 hours while removing the ammonia generated. A temperature of from about 50° C. to 180° C. and preferably 120° C.-140° C. for 1 to 10 hours is preferred when adding urea to the polyoxyalkylene.

The present invention will be further illustrated by the following examples which are only for the purpose of illustration and are not to be regarded as limiting the invention in any way.

EXAMPLE 1

PREPARATION OF JEFFAMINE® TUT-3000 UREA

A one liter three-necked flask equipped with a thermometer, stirrer, condenser and nitrogen inlet was charged with 669.4 g of JEFFAMINE® T-3000 amine and 40.2 g of urea. The mixture was heated to 135°-140° C. for 5 hours. The ammonia generated was removed into a water trap. The resulting JEFFAMINE® TUT-3000 urea was used as the active hydrogen component for the preparation of polybiuret foams.

EXAMPLE 2

PREPARATION OF JEFFAMINE® TUT-5000 UREA

The procedure of Example 1 was followed except that 708.9 g of JEFFAMINE® T-5000 amine and 20 g of urea were used. The resulting JEFFAMINE® TUT-5000 urea was used as an active hydrogen component for the preparation of polybiuret foams.

A series of tests were carried out to examine the reaction of JEFFAMINE® urea derivatives with polyisocyanates. It showed that various foams can be made from JEFFAMINE® amine urea derivatives and polyisocyanates.

EXAMPLE 3

To a small paper cup was added 53.5 g of JEFFAMINE[200] BUD-2000 urea and 25.2 g of a prepolymer made from PPG-2000 and ISONATE® 143L (6303-81A, eq. wt. 269). On stirring with a tongue depressor the materials reacted to give a tough elastomer foam. The gel time was about 17 minutes.

EXAMPLE 4

To a small paper cup was added 59.4 g of JEFFAMINE® BUD-2000 urea and 15.3 g of a prepolymer made from THANOL® G-5000 and ISONATE® 143L. On stirring with a tongue depressor the materials reacted to produce a tough elastomer foam. The gel time was about 10 minutes.

EXAMPLE 5

To a small paper cup was added 43.4 g of JEFFAMINE® BUD-2000 urea and 13.6 g of a prepolymer of JEFFAMINE® T-5000 amine and ISONATE® 143L (6120-29-01 eq. wt. 310). On stirring with a tongue depressor the materials reacted to produce a tough foam. The gel time was about 7 minutes.

EXAMPLE 6

To a small paper cup was added JEFFAMINE® BUD-2000 urea (40 g), prepolymer (as prepared in Example 5, 81.3 g) and water (2.0 g). After stirring with a tongue depressor the mixture was poured into a bigger paper cup to produce a nice flexible foam. The gel time was about 110 seconds.

EXAMPLE 7

The procedure of Example 6 was used with the following formulations:

| JEFFAMINE® BUD-2000 Urea | 45.5 g |
| RUBINATE® M | 29.4 g |
| Water | 1.0 g |
| Quadrol | 6.8 g |

A rigid foam was produced which would be suitable as a packaging foam. The gel time was about 50 seconds.

EXAMPLE 8

The procedure of Example 6 was used with the following formulation:

| JEFFAMINE® BUD-2000 Urea | 45.5 g |
| RUBINATE® M | 33.5 g |
| Water | 1.0 g |
| Quadrol | 6.8 g |
| L-711 silicone | 0.45 g |

A rigid foam was produced which was slightly glassy but could be used as a packaging foam. The gel time was about 45 seconds.

EXAMPLE 9

The procedure of Example 6 was used with the following formulation:

| JEFFAMINE® BUD-2000 Urea | 45.5 g |
| Water | 1.0 g |
| ISONATE® 143L | 31.4 g |
| Quadrol | 4.6 g |

A nice rigid foam which could be used as a packaging foam was produced. The gel time was 50 seconds.

EXAMPLE 10

The procedure of Example 6 was used with the following formulation:

| | |
|---|---|
| JEFFAMINE ® TUT-5000 Urea | 40 g |
| TDI | 20.6 g |
| Water | 0.88 g |
| DEA | 4.0 g |
| L-711 silicone | 0.4 g |

A flexible foam was produced. The rise time was 75 seconds. This foam shrank indicating not enough crosslinking or improper posturing.

EXAMPLE 11-16

These examples illustrate the use of the JEFFAMINE® urea derivatives in the preparation of polybiuret foams. Details of the formulations and foam properties are listed in Table 1. The component numbers are parts by weight. The foams were post cured at 120° C.

EXAMPLE 17

A biuret foam was prepared using ethylene urea as a cross-linker. The following ingredients were used to make this shock absorbing foam.

| | |
|---|---|
| L-711 Silicone | 1.5 parts |
| JEFFAMINE ® BUD-2000 Urea | 100 parts |
| Ethylene Urea | 5.0 parts |
| Water | 5.0 parts |
| Rubinate M | 103.5 parts |

The foam did not shrink at ambient temperature. It had a rise time of 135 seconds and a density of 1.97 pounds per cubic foot.

TABLE 1

| Formulation parts by weight | Polybiuret Foams Foam No. | | | | | |
|---|---|---|---|---|---|---|
| | 11 | 12 | 13 | 14 | 15 | 16 |
| JEFFAMINE ® BUD-2000 | 100 | 100 | 100 | — | — | — |
| JEFFAMINE ® TUT-3000 | — | — | — | 100 | 100 | 100 |
| Water | 5.0 | 2.2 | 2.2 | 5.0 | 5.0 | 5.0 |
| L-711 Silicone | — | 2.0 | — | 1.0 | 1.5 | 1.5 |
| DC-193 Silicone | — | — | 1.0 | — | — | — |
| Quadrol | — | 15.0 | 15.0 | — | — | — |
| Diethanolamine | — | — | — | — | — | 2.0 |
| Rubinate M | — | 73.7 | 73.7 | 90 | — | — |
| TDI | — | — | — | — | 57.1 | 62.0 |
| 6120-29-01 | 203.2 | — | — | — | — | — |
| Index | 1.0 | 1.0 | 1.0 | 1.0 | 1.0 | 1.0 |
| Rise time, sec. | 130 | 62 | 70 | 70 | 50 | 60 |
| Density, pcf | 7.2 | 3.56 | 7.78 | 2.03 | 1.55 | 1.51 |
| Type of foam | Flexible | Rigid | Semirigid | Flexible | Flexible | Flexible |

Quadrol is a tradename of BASF. It is the tetrapropoxy derivative of ethylenediamine (HOCHCH₃—CH₂)₂NCH₂CH₂N(CH₂—CHCH₃OH)₂

What is claimed is:

1. Polybiuret compositions comprising the reaction products of polyoxyalkylene polyureas and polyisocyanates.

2. The composition of claim 1 wherein the polyoxyalkylene urea is the product of the reaction of a polyoxyalkylene amine and a urea.

3. The composition of claim 2 wherein the polyoxyalkylene amine starting material has the formula:

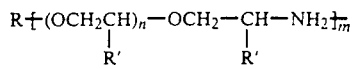

wherein R is the nucleus of an polyhydric alcohol containing 2 to 12 carbon atoms and 2 and 3 hydroxyl groups, R' is hydrogen or methyl, n is a number having an average value of 0 to 50, and m is an integer having a value of 2 to 3.

4. The composition of claim 3 wherein the average molecular weight will be from 200 to 5000.

5. The composition of claim 3 wherein the polyoxyalkylene amine is a polyoxyalkylene triamine of the formula:

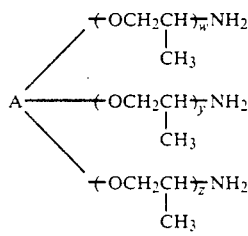

wherein A represents the nucleus of an oxyalkylation-susceptible trihydric alcohol containing about 3 to about 6 carbon atoms, w, y and z are numbers and the average value of the sum of w+y+z is from about 4 to about 100.

6. The composition of claim 5 wherein A represents a trimethylol propane nucleus and the triamine has an average molecular weight of about 400.

7. The composition of claim 5 wherein A represents a trimethylol propane nucleus and the triamine has an average molecular weight of about 3000.

8. The composition of claim 5 wherein the average molecular weight is about 5000 wherein A represents a glycerol nucleus and the triamine contains about 85 moles of propylene oxide.

9. The composition of claim 1 wherein the polyisocyanate component is a prepolymer from the reaction of a polyol and a polyisocyanate.

10. The composition of claim 1 wherein the polyoxypropylene polyurea has the formula:

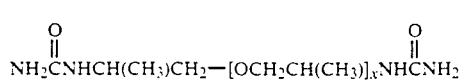

wherein x is 2 to 50 and having a molecular weight of 2000-3000.

11. The composition of claim 1 wherein the polyoxypropylene polyurea has the formula:

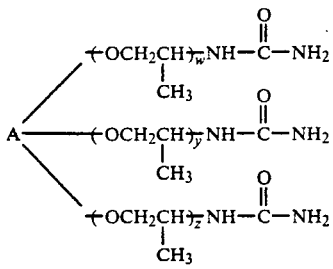

wherein A represents the nucleus of an oxyalkylation-susceptible trihydric alcohol containing about 3 to about 6 carbon atoms, w, y and z are numbers and the average value of the sum of $w+y+z$ is from about 4 to about 100 and having a molecular weight of 400–5000.

12. The composition of claim 9 wherein the polyol is a polypropylene oxide triol having a molecular weight of about 5000.

13. The composition of claim 9 wherein the polyisocyanate is selected from the group consisting of diphenylmethane diisocyanate, toluene diisocyanate, hexamethylene diisocyanate and the trimeric form of hexamethylene diisocyanate.

14. The composition of claim 1 wherein the polyisocyanate is a prepolymer from the reaction of a polyoxyalkylene polyamine and a polyisocyanate.

15. The composition of claim 14 wherein the polyoxyalkylene amine has the formula:

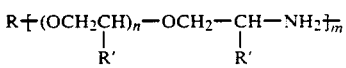

wherein R is the nucleus of an oxyalkylation-susceptible polyhydric alcohol containing 2 to 12 carbon atoms and 2 and 3 hydroxyl groups, R' is hydrogen or methyl, n is a number having an average value of 0 to 50, and m is an integer having a value of 2 to 3.

16. The composition of claim 14 wherein the polyoxyalkylene amine is derived from the polyoxyalkylene triamine of the formula:

$$A \begin{cases} (OCH_2CH)_w NH_2 \\ \quad\quad | \\ \quad\quad CH_3 \\ (OCH_2CH)_y NH_2 \\ \quad\quad | \\ \quad\quad CH_3 \\ (OCH_2CH)_z NH_2 \\ \quad\quad | \\ \quad\quad CH_3 \end{cases}$$

wherein A represents the nucleus of an oxyalkylation-susceptible trihydric alcohol containing about 3 to about 6 carbon atoms, w, y and z are numbers and the average value of the sum of $w+y+z$ is from about 4 to about 100.

17. The composition of claim 14 wherein the average molecular weight is about 5000 wherein A represents a glycerol nucleus and the triamine contains about 85 moles of propylene oxide.

18. The composition of claim 14 wherein the polyisocyanate is selected from the group consisting of diphenylmethane diisocyanate, toluene diisocyanate, hexamethylene diisocyanate and the trimeric form of hexamethylene diisocyanate.

19. The composition of claim 1 wherein the polyisocyanate is selected from the group consisting of naphthalene diisocyanate, diphenylmethane diisocyanate, polyarylmethane polyisocyanate, and toluene diisocyanate.

* * * * *

UNITED STATES PATENT AND TRADEMARK OFFICE
CERTIFICATE OF CORRECTION

PATENT NO. : 5,013,812

DATED : May 7, 1991

INVENTOR(S) : George Phillip Speranza and Wei-Yang Su

It is certified that error appears in the above-identified patent and that said Letters Patent is hereby corrected as shown below:

Claim 3, Col. 8, line 13, please insert

--oxyalkylation-susceptible-- after an.

Signed and Sealed this

Eighth Day of September, 1992

Attest:

DOUGLAS B. COMER

Attesting Officer     Acting Commissioner of Patents and Trademarks